United States Patent
Rajkotia (10) Patent No.: US 7,039,429 B2
(45) Date of Patent: May 2, 2006

(54) SYSTEM AND METHOD FOR PAGING A MOBILE STATION IN A WIRELESS NETWORK

(75) Inventor: Purva R. Rajkotia, Plano, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 237 days.

(21) Appl. No.: 10/434,331

(22) Filed: May 8, 2003

(65) Prior Publication Data

US 2004/0224687 A1 Nov. 11, 2004

(51) Int. Cl.
*H04Q 7/20* (2006.01)
(52) U.S. Cl. ............... 455/458; 455/432.1; 455/435.1; 455/433
(58) Field of Classification Search ............ 455/435.1, 455/432.1, 433, 450, 458, 509, 516–517, 455/525
See application file for complete search history.

(56) References Cited

U.S. PATENT DOCUMENTS

| | | | | |
|---|---|---|---|---|
| 5,797,097 A | * | 8/1998 | Roach et al. | 455/456.2 |
| 5,943,621 A | * | 8/1999 | Ho et al. | 455/440 |
| 5,960,356 A | * | 9/1999 | Alperovich et al. | 455/458 |
| 6,081,711 A | * | 6/2000 | Geulen | 455/432.1 |
| 6,418,315 B1 | * | 7/2002 | Seo et al. | 455/435.1 |
| 6,532,363 B1 | * | 3/2003 | Pussinen | 455/435.1 |
| 6,542,752 B1 | * | 4/2003 | Illidge | 455/458 |
| 6,628,942 B1 | * | 9/2003 | Beming et al. | 455/458 |
| 6,714,528 B1 | * | 3/2004 | Moon et al. | 455/450 |
| 6,731,936 B1 | * | 5/2004 | Chen et al. | 455/437 |
| 6,757,520 B1 | * | 6/2004 | Attar et al. | 455/437 |
| 6,795,689 B1 | * | 9/2004 | Ogren et al. | 455/67.13 |
| 6,836,653 B1 | * | 12/2004 | Kang | 455/435.1 |
| 2001/0031641 A1 | * | 10/2001 | Ung et al. | 455/435 |
| 2002/0019228 A1 | * | 2/2002 | McKenna et al. | 455/433 |
| 2003/0040314 A1 | * | 2/2003 | Hogan et al. | 455/435 |
| 2003/0125025 A1 | * | 7/2003 | Lim | 455/435 |
| 2004/0179492 A1 | * | 9/2004 | Zhang et al. | 370/331 |
| 2004/0203655 A1 | * | 10/2004 | Sinnarajah et al. | 455/561 |

* cited by examiner

*Primary Examiner*—Joseph Feild
*Assistant Examiner*—Kamran Afshar (57) ABSTRACT

A method includes receiving a signal from a base station at a mobile station. The method also includes communicating a message to the base station. The message identifies a frequency associated with the received signal. In addition, the method includes receiving a page from the base station on the identified frequency associated with the received signal.

22 Claims, 8 Drawing Sheets

SYSTEM AND METHOD FOR PAGING A MOBILE STATION IN A WIRELESS NETWORK

TECHNICAL FIELD

This disclosure is generally directed to communication systems and more specifically to a system and method for paging a mobile station in a wireless network.

BACKGROUND

Wireless communication devices are becoming increasingly popular in the United States and around the world. These communication devices typically receive communication services from one or more wireless networks. A typical wireless network includes one or more base stations, each base station providing services in an area referred to as a cell or a zone. The wireless devices can often move and receive communication services from multiple cells in the same network or from cells in different networks.

Typical wireless networks can provide telephony services to users, such as by establishing incoming and outgoing telephone calls to and from the wireless devices. In order to establish an incoming telephone call, a wireless network typically pages a wireless device. A problem with conventional wireless networks is that the paging process occurs indiscriminately across multiple frequencies and without regard to a particular frequency on which the mobile station is operating. As a result, the paging process often wastes resources of the networks.

SUMMARY

This disclosure provides a system and method for paging a mobile station in a wireless network.

In one embodiment, a method includes receiving a signal from a base station in a mobile station. The method also includes communicating a message to the base station. The message identifies a frequency associated with the received signal. In addition, the method includes receiving a page from the base station on the identified frequency associated with the received signal.

In another embodiment, a method includes communicating a signal at a base station and receiving a message from a mobile station. The message identifies a frequency associated with the communicated signal. The method also includes communicating at least a portion of the message to a mobile switching center. The method further includes receiving a paging request from the mobile switching center. The paging request identifies the frequency identified in the message from the mobile station. In addition, the method includes paging the mobile station on the frequency identified in the paging request.

In yet another embodiment, a method includes receiving a message from a base station at a mobile switching center. The message identifies a frequency associated with a signal communicated from the base station to a mobile station. The method also includes storing at least a portion of the message and receiving a request associated with an incoming communication session for the mobile station. The method further includes generating a paging request for the mobile station. The paging request identifies the frequency identified in the stored message. In addition, the method includes communicating the paging request to the base station. The base station is operable to page the mobile station on the frequency identified in the paging request.

One or more technical features may be present according to various embodiments of this disclosure. Particular embodiments of this disclosure may exhibit none, some, or all of the following features depending on the implementation. For example, in one embodiment, a system for paging a mobile station in a wireless network is provided. In particular, the mobile station may register with the wireless network, and the wireless network identifies the frequency being used by the mobile station to register. When the wireless network needs to page the mobile station, the wireless network pages the mobile station using the identified frequency. By paging the mobile station on the identified frequency, the wireless network may page the mobile station using fewer resources. Using fewer resources to page the mobile stations may allow the wireless network to provide services to more mobile stations.

Moreover, the mobile station may inform the wireless network when the frequency it is using changes. In this way, the wireless network need not include logic to determine the frequency being used by a particular mobile station. As a result, the complexity of the wireless network may be decreased, which may also help to reduce the cost of the wireless network.

This has outlined rather broadly several features of this disclosure so that those skilled in the art may better understand the DETAILED DESCRIPTION that follows. Additional features may be described later in this document. Those skilled in the art should appreciate that they may readily use the concepts and the specific embodiments disclosed as a basis for modifying or designing other structures for carrying out the same purposes of this disclosure. Those skilled in the art should also realize that such equivalent constructions do not depart from the spirit and scope of the invention in its broadest form.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior as well as future uses of such defined words and phrases.

BRIEF DESCRIPTION OF THE DRAWINGS

For a more complete understanding of this disclosure and its features, reference is now made to the following description taken in conjunction with the accompanying drawings, in which.

DETAILED DESCRIPTION

Figure 1:
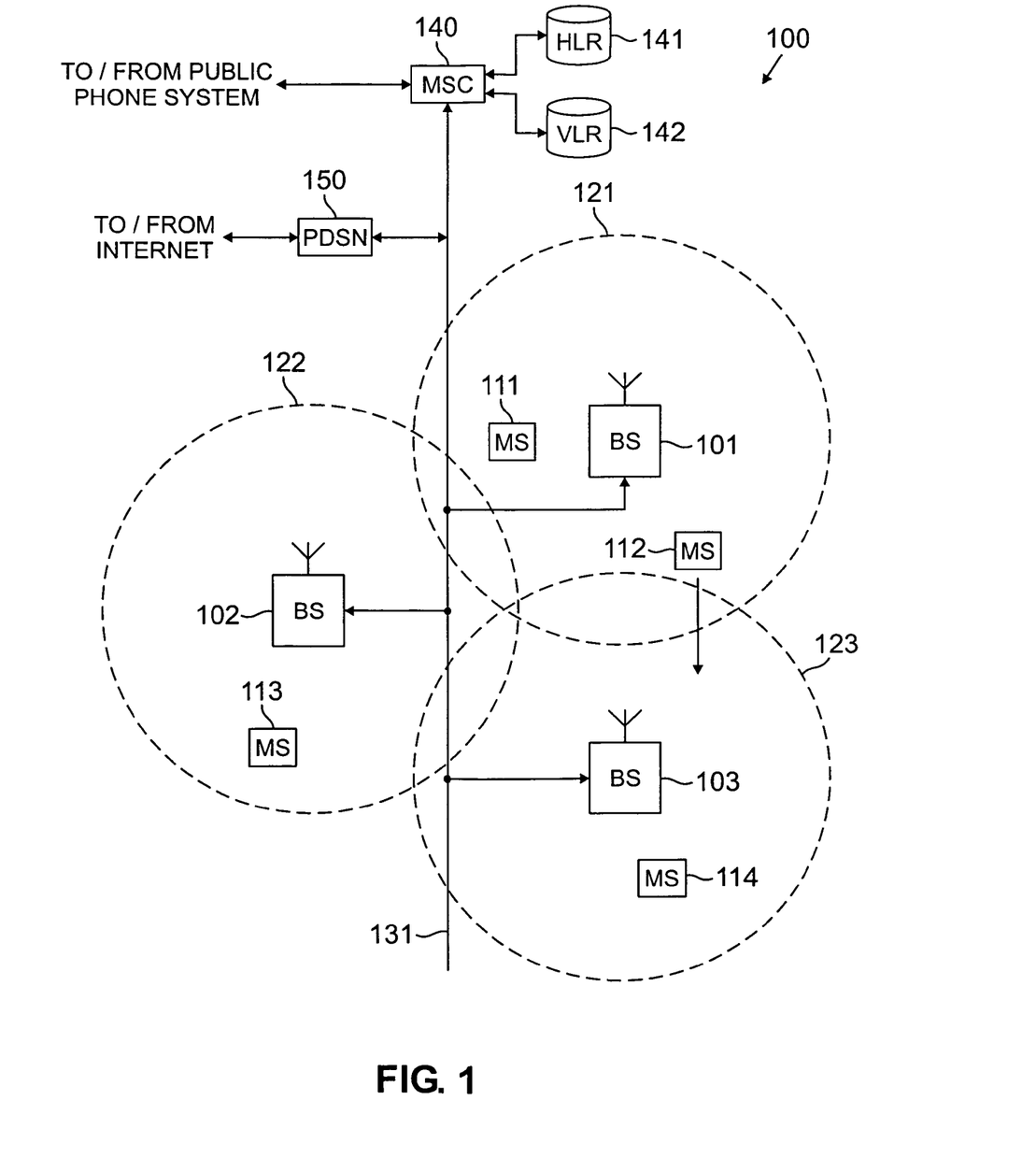
FIG. 1 illustrates an example wireless network according to one embodiment of this disclosure.

FIG. 1 illustrates an example wireless network 100 according to one embodiment of this disclosure. The wireless network 100 illustrated in FIG. 1 is for illustration only. Other networks could be used without departing from the scope of this disclosure.

In the illustrated example, the wireless network 100 includes multiple cell sites 121–123. Base stations (BS) 101–103 are located in the cell sites 121–123. Each of the base stations 101–103 communicates with one or more mobile stations (MS) 111–114 over wireless connections. The mobile stations 111–114 may represent any suitable wireless devices. For example, the mobile stations 111–114 could represent conventional cellular telephones, personal communication services (PCS) handsets, personal digital assistants, portable computers, or metering devices. Other types of access terminals, including fixed wireless terminals, may be used in the wireless network 100. Also, the mobile stations 111–114 could communicate using any suitable mechanism, such as wireless code division multiple access (CDMA) channels.

The dotted lines shown in FIG. 1 illustrate the approximate boundaries of the cell sites 121–123 in which the base stations 101–103 are located. The cell sites 121–123 are illustrated as being approximately circular for the purposes of illustration and explanation only. The cell sites 121–123 may have any other shape or shapes, depending on the cell configuration selected and natural and man-made obstructions.

In one embodiment, each of the cell sites 121–123 includes one or more sectors, each sector being illuminated by a directional antenna contained in or coupled to one of the base stations 101–103. In FIG. 1, the base stations 101–103 lie in the center of the cell sites 121–123. Other embodiments may position the base stations 101–103 or the directional antennas in any other suitable positions.

In one embodiment, each of the base stations 101–103 includes a base station controller (BSC) and one or more base transceiver substations (BTS). A base station controller manages wireless communication resources, including the base transceiver substations, for one of the cell sites 121–123. A base transceiver substation may include radio frequency (RF) transceivers, antennas, and other electrical equipment located in one of the cell sites 121–123. The base transceiver substation may also include air conditioning units, heating units, electrical power supplies, telephone line interfaces, and RF transmitters and RF receivers. For the purposes of simplicity and clarity, the base transceiver substations in each of the cell sites 121–123 and the base station controller associated with the base transceiver substations are collectively represented by the base stations 101–103.

The base stations 101–103 transfer voice and data signals between each other via a communication line 131. The base stations 101–103 may also transmit and receive voice and data signals to and from a public switched telephone network (PSTN) via the communication line 131 and a mobile switching center (MSC) 140. The base stations 101–103 may further transmit and receive voice and data signals, such as packet data, to and from the Internet or other data network via the communication line 131 and a packet data server node (PDSN) 150. Beyond that, the base stations 101–103 transmit one or more pilot signals, which are used by the mobile stations 111–114 to detect and register with the base stations 101–103. In addition, the communication line 131 provides a connection path to transfer control signals between the MSC 140 and the base stations 101–103. The control signals may be used to establish voice and data circuits, such as circuits between the MSC 140 and the base stations 101–103.

The communication line 131 may represent any suitable connection, including a T1 line, a T3 line, a fiber optic link, a network packet data backbone connection, or any other type of connection. In one embodiment, the communication line 131 may link vocoders in the base stations 101–103 with switch elements in the MSC 140. The connections on the communication line 131 may provide a transmission path for the transport of analog voice band signals, pulse code modulated (PCM) voice signals, voice signals in an Internet Protocol (IP) format, voice signals in an asynchronous transfer mode (ATM) format, or other suitable connection transmission protocol. Further, any suitable signaling protocol could be used to transport signals over the communication line 131.

The MSC 140 provides services and coordination between subscribers using the mobile stations 111–114 in the wireless network 100 and external networks, such as the PSTN or Internet. In some embodiments, the communication line 131 may represent several different data links, where each data link couples one of the base stations 101–103 to the MSC 140.

The MSC 140 may store information about the mobile stations 111–114 in a home location register (HLR) 141 and in a visitor location register (VLR) 142. In one embodiment, the wireless network 100 may be a "home" network for mobile stations 111–114 that belong to the wireless network 100. Other mobile stations 111–114 that belong to other networks may roam into or visit the wireless network 100. In this embodiment, the HLR 141 stores information about the mobile stations 111–114 that belong to the wireless network 100, and the VLR 142 stores information about the mobile stations 111–114 that are visiting the wireless network 100.

In the illustrated example, the mobile station 111 is located in cell site 121 and is in communication with the base station 101. The mobile station 113 is located in cell site 122 and is in communication with the base station 102. The mobile station 114 is located in cell site 123 and is in communication with the base station 103. The mobile station 112 is located in cell site 121 but is close to and moving in the direction of cell site 123. At some point, as the mobile station 112 moves into cell site 123 and out of cell site 121, a handoff occurs.

A handoff procedure transfers control of a call from a first cell site to a second cell site. As the mobile station 112 moves from cell site 121 to cell site 123, the mobile station 112 detects a pilot signal from the base station 103 and sends a pilot strength measurement message to the base station 101. When the strength of the pilot signal transmitted by the base station 103 and received and reported by the mobile station 112 exceeds a threshold, the base station 101 initiates a soft handoff process. For example, the base station 101 may signal the target base station 103 that a handoff is needed as described in TIA/EIA IS-95 or TIA/EIA IS-2000.

The base station 103 and the mobile station 112 may then negotiate the establishment of a communication link in the CDMA channel. Following the establishment of the communication link between the base station 103 and the mobile station 112, the mobile station 112 communicates with both the base station 101 and the base station 103 in a soft handoff mode. This may help to improve the performance on both the forward channel (base station to mobile station) and reverse channel (mobile station to base station) links. When the signal from the base station 101 falls below a predetermined signal strength threshold, the mobile station 112 drops the link with the base station 101 and only receives signals from the base station 103. The call may thereby be seamlessly transferred from the base station 101 to the base station 103. The above-described soft handoff assumes that the mobile station 112 is handling a voice or data call. An idle handoff may occur between two of the cell sites 121–123 when the mobile station 112 is communicating in the control or paging channel.

In one aspect of operation, the wireless network 100 communicates with and establishes communication sessions with the mobile stations 111–114. For example, the wireless network 100 could establish incoming and outgoing telephone calls with, for example, mobile station 111. To establish an incoming call with the mobile station 111, the wireless network 100 pages the mobile station 111 on the paging channel. As an example, during a page, the base station 101 may communicate a paging message to the mobile station 111 on the paging channel. The mobile station 111 receives the paging message and responds, allowing the base station 101 to establish the communication session with the mobile station 111.

The mobile stations 111–114 may roam into and register with the wireless network 100. For example, the mobile station 111 may detect a pilot signal from the base station 101 and respond by transmitting a registration message to the base station 101. In one embodiment, each one of the base stations 101–103 may transmit multiple pilot signals at multiple frequencies. In this embodiment, each one of the mobile stations 111–114 may detect one or more of the pilot signals and transmit a registration message to one of the base stations 101–103. The base stations 101–103 may then forward the registration messages to the MSC 140, which stores information about the mobile stations 111–114 in the HLR 141 or the VLR 142.

In one embodiment, the registration message identifies the cell site 121 and the sector in which the registering mobile station 111 is located. The registration message may also identify the frequency used by the registering mobile station 111. For example, the registration message could identify the frequency being used by the mobile station 111 to communicate the registration message to the base station 101. This may also represent the frequency that the base station 101 should later use to page the registering mobile station 111. The MSC 140 then stores the cell site 121, sector, and frequency in the HLR 141 or VLR 142.

When an incoming communication session for the mobile station 111 is detected, the MSC 140 accesses the HLR 141 or VLR 142 and identifies the cell site 121, the sector, and the frequency to be used to page the mobile station 111. The MSC 140 then communicates a request to the base station 101, and the base station 101 pages the mobile station 111 using the sector and frequency identified by the MSC 140. In this way, the wireless network 100 can page the mobile station 111 in a more efficient manner. As a particular example, the wireless network 100 can page the mobile station 111 using fewer resources.

In another aspect of operation, the mobile station 111 may roam within the wireless network 100. For example, the mobile station 111 could move between cell sites 121–123 or between sectors in the same cell site. The mobile station 111 could also change frequencies used to communicate with a base station 101. As an example, the base station 101 could determine that the frequency used by the mobile station 111 is too loaded, and the base station 101 could instruct the mobile station 111 to change frequencies.

In this embodiment, when at least one of the cell site, sector, or frequency changes, the mobile station 111 may communicate an update message to the base station 101. In one embodiment, the update message represents a modified registration message. In a particular embodiment, the update message may include only the information that has changed, such as the new cell site, sector, or frequency. The MSC 140 could then store the updated information in the HLR 141 or the VLR 142. In this way, the mobile station 111 need not communicate an entire registration message to the base station 101, which reduces the bandwidth used by the mobile station 111. Also, conventional systems may require the use of a hashing algorithm at the base stations 101 and at the mobile station 111 to identify the frequency used by the base station 101 and the mobile station 111 to communicate. In one embodiment of this disclosure, the use of a hashing algorithm may not be needed at the base station 101 since the mobile station 111 informs the wireless network 100 of the frequency being used by the mobile station 111. The hashing algorithm may or may not still be executed at the mobile station 111. This may help to reduce the complexity of the base stations 101–103, which may also help to reduce the cost of the base stations 101–103.

In yet another aspect of operation, a mobile station 111 may communicate with a base station 101 on one of multiple frequencies. One of these frequencies may be marked as a "home" frequency for a particular mobile station 111. In conventional systems, a mobile station 111 may be forced to return to its home frequency after a communication session ends. In one embodiment of this disclosure, the mobile station 111 may use the registration and updating mechanisms discussed above. By using these mechanisms, the wireless network 100 need not force the mobile stations 111–114 to return to a home frequency.

Although FIG. 1 illustrates one example of a wireless network 100, various changes may be made to FIG. 1. For example, the network 100 could include any suitable number of base stations 101–103 and cell sites 121–123. Also, the network 100 could be connected to any suitable external network instead of or in addition to the PSTN and the Internet shown in FIG. 1.

Figure 2:
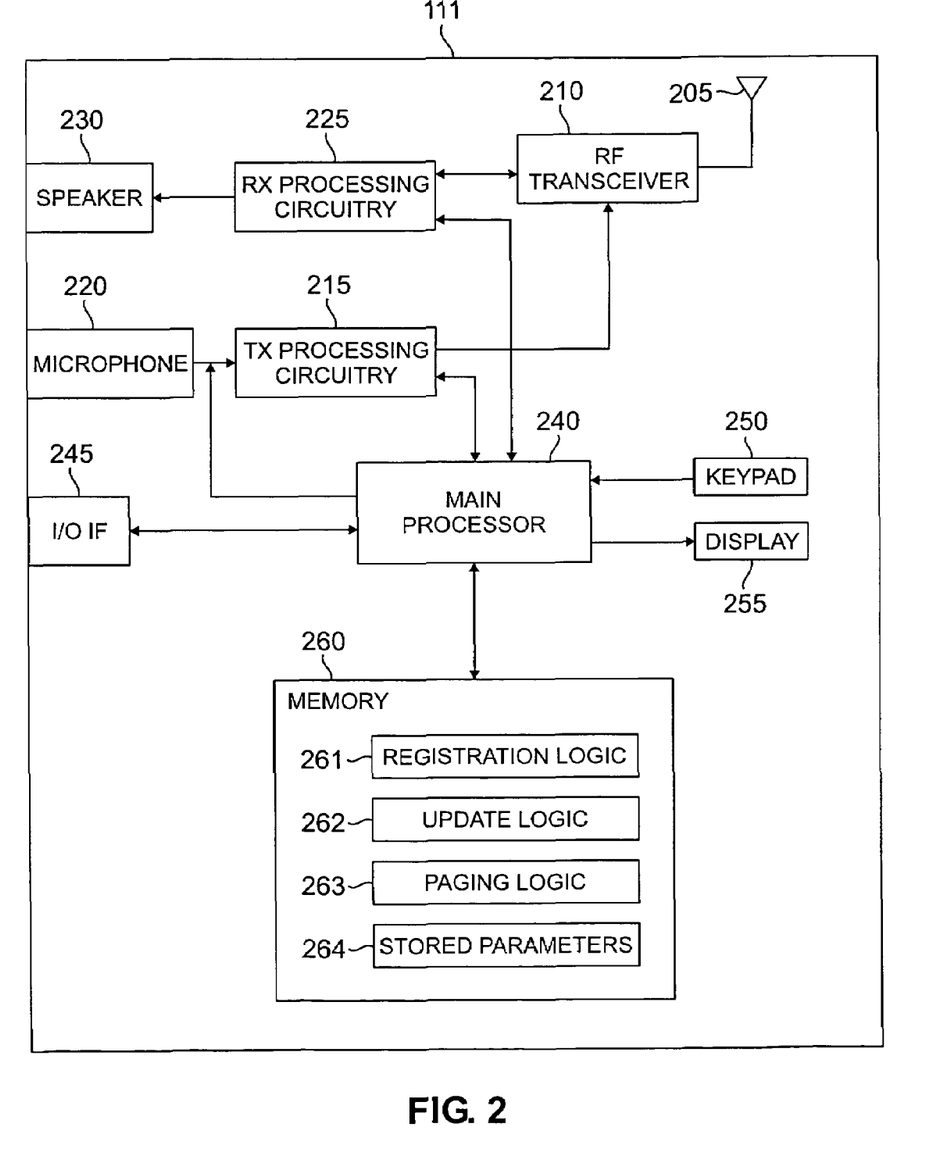
FIG. 2 illustrates an example mobile station according to one embodiment of this disclosure.

FIG. 2 illustrates an example mobile station 111 in accordance with one embodiment of this disclosure. The mobile station 111 illustrated in FIG. 2 is for illustration only. Other mobile stations could be used without departing from the scope of this disclosure. Also, the mobile station 111 in FIG. 2 has been simplified for ease of illustration and explanation.

In this example embodiment, the mobile station 111 includes an antenna 205, a radio frequency (RF) transceiver 210, transmit (TX) processing circuitry 215, a microphone 220, receive (RX) processing circuitry 225, and a speaker 230. The mobile station 111 also includes a main processor 240, an input/output interface (I/O IF) 245, a keypad 250, a display 255, and a memory 260. The memory 260 includes registration logic 261, update logic 262, paging logic 263, and one or more stored parameters 264.

The RF transceiver 210 receives through the antenna 205 an incoming RF signal transmitted by a base station 101 in the wireless network 100. The RF transceiver 210 down-converts the incoming RF signal to produce an intermediate frequency (IF) signal or a baseband signal. The IF or baseband signal is sent to the receive processing circuitry 225, which produces a processed baseband signal by filtering, decoding, and/or digitizing the baseband or IF signal. The receive processing circuitry 225 transmits the processed baseband signal to the speaker 230 (such as for voice data) or to the main processor 240 for further processing (such as for web browsing).

The transmit processing circuitry 215 receives analog or digital voice data from the microphone 220 or other outgoing baseband data (such as web data, e-mail, or interactive video game data) from the main processor 240. The transmit processing circuitry 215 encodes, multiplexes, and/or digitizes the outgoing baseband data to produce a processed baseband or IF signal. The RF transceiver 210 receives the outgoing processed baseband or IF signal from the transmit processing circuitry 215. The RF transceiver 210 up-converts the baseband or IF signal to produce an RF signal that is then transmitted via the antenna 205.

The main processor 240 may represent any suitable processor or controller. The memory 260 is coupled to the main processor 240. In one embodiment, part of the memory 260 represents a random access memory (RAM), and another part of the memory 260 represents a flash or other read-only memory (ROM).

The main processor 240 executes the registration logic 261 stored in the memory 260. The registration logic 261 allows the mobile station 111 to register with the wireless network 100. For example, the mobile station 111 may receive a pilot signal from a base station 101 through the antenna 205. The main processor 240 may detect the pilot signal and generate a response, such as by generating a registration message for the base station 101. In one embodiment, the registration message identifies the cell site 121 and the sector in which the mobile station 111 is located. The cell site 121 and the sector may be identified using information contained in the pilot signal. The registration message may also include the frequency being used by the mobile station 111 to communicate with the base station 101. As an example, the frequency could represent the frequency of the pilot signal received by the mobile station 111. The main processor 240 may then supply the registration message to the transmit processing circuitry 215, which communicates the registration message to the base station 101 through the RF transceiver 210 and the antenna 205. The cell site 121, sector, and frequency identified in the registration message may then be stored as parameters 264 in the memory 260.

The main processor 240 also executes the update logic 262 stored in the memory 260. The update logic 262 detects when the mobile station 111 moves into a different one of the cell sites 121–123 or into a different sector or begins using a different frequency to communicate with a base station 101. For example, the main processor 240 may detect when the information contained in the pilot signal received from one of the base stations 101–103 differs from the stored parameters 264. The main processor 240 may then generate an update message, which identifies the new cell site, sector, or frequency. The update message may be communicated to one of the base stations 101–103 through the transmit processing circuitry 215, the RF transceiver 210, and the antenna 205.

The main processor 240 may further execute the paging logic 263 stored in the memory 260. The paging logic 263 detects when one of the base stations 101–103 is paging the mobile station 111. For example, the base station 101 may communicate a paging message to the mobile station 111 on the paging channel when the base station 101 is attempting to deliver an incoming message or telephone call to the mobile station 111. The paging logic 263 may then cause the main processor 240 to take any suitable action, such as generating a response to the paging message that includes information needed by the base station 101 to deliver the incoming message or telephone call.

Each component of the mobile station 111 may include any hardware, software, firmware, or combination thereof. Also, the registration logic 261, the update logic 262, and the paging logic 263 may be implemented in any suitable hardware, software, firmware, or combination thereof.

Although FIG. 2 illustrates one example of a mobile station 111, various changes may be made to FIG. 2. For example, other one-way or multi-way communication devices could be used in the wireless network 100. Also, various components could be combined or omitted or additional components can be added according to particular needs.

Figure 3:
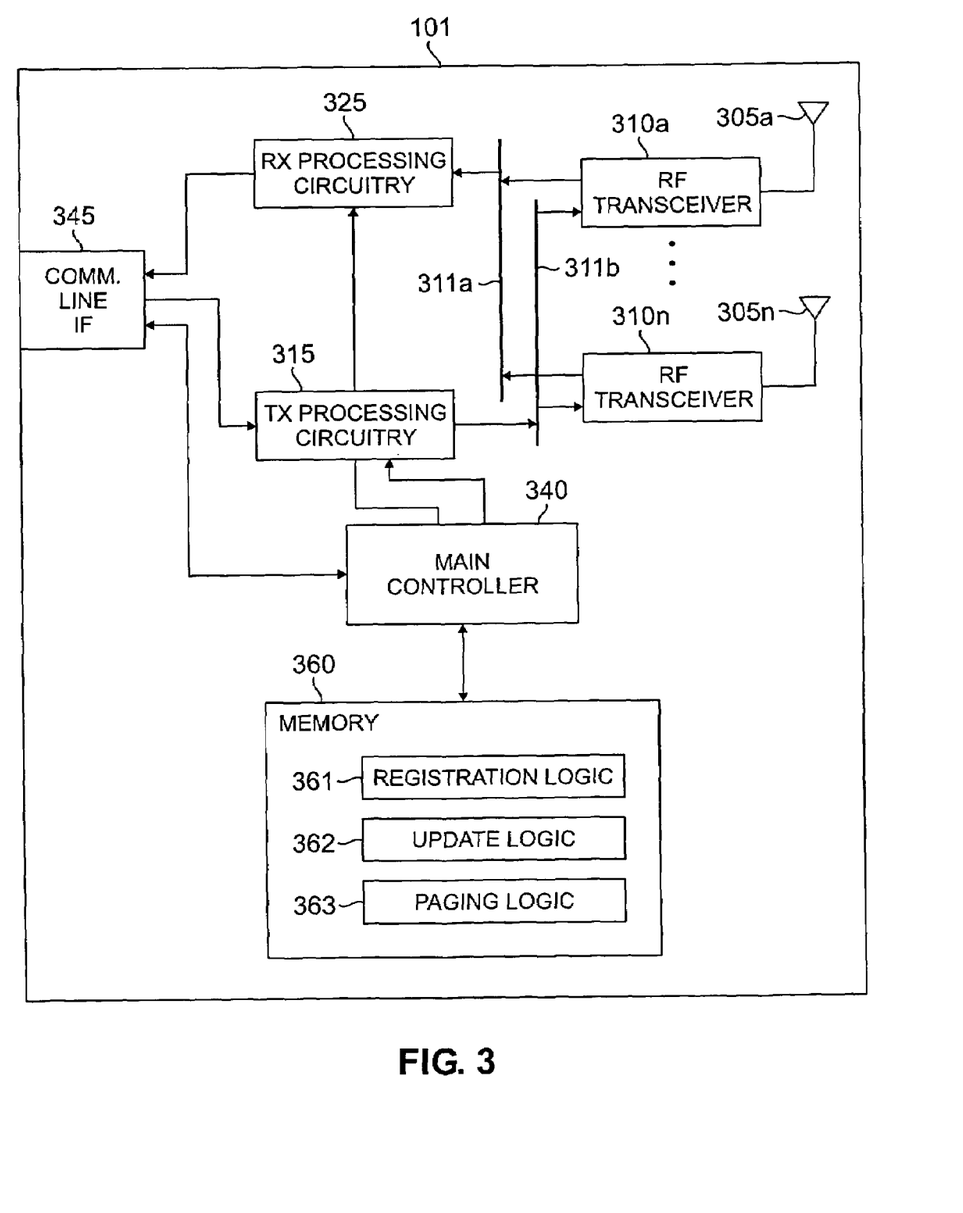
FIG. 3 illustrates an example base station according to one embodiment of this disclosure.

FIG. 3 illustrates an example base station 101 according to one embodiment of this disclosure. The base station 101 illustrated in FIG. 3 is for illustration only. Other base stations could be used without departing from the scope of this disclosure. Also, the base station 101 in FIG. 3 has been simplified for ease of illustration and explanation.

In this example embodiment, the base station 101 includes one or more antennas 305$a$–305$n$, one or more RF transceivers 310$a$–310$n$, two buses 311–311$b$, transmit (TX) processing circuitry 315, and receive (RX) processing circuitry 325. The base station 101 also includes a main controller 340, a communication line interface 345, and a memory 360. The memory 360 includes registration logic 361, update logic 362, and paging logic 363.

The RF transceivers 310$a$–310$n$ communicate with the mobile stations 111–114 through the antennas 305–305$n$. For example, the RF transceivers 310$a$–310$n$ could down-convert incoming RF signals to produce IF signals or baseband signals. The RF transceivers 310$a$–310$n$ could also up-convert outgoing IF signals or baseband signals to produce RF signals. The incoming signals may be sent to the receive processing circuitry 325, which then forwards the received signals to the communication line 131 through the communication line interface 345. The outgoing signals may be received from the transmit processing circuitry 315, which may receive the outgoing signals from the communication line 131 through the communication line interface 345.

The buses 311$a$–311$b$ facilitate communication between the transmit processing circuitry 315, the receive processing circuitry 325, and the transceivers 310$a$–310$n$. For example, the bus 311$a$ could transport incoming signals from the transceivers 310$a$–310$n$ to the receive processing circuitry 325. The bus 311b could transport outgoing signals from the transmit processing circuitry 315 to the transceivers 310a–310n.

The communication line interface 345 facilitates communication with the other base stations 102–103, the MSC 140, or the PSDN 150 over the communication line 131. The communication line interface 345 may, for example, represent a T1 interface, a T3 interface, a fiber optic interface, or any other type of interface.

The main controller 340 may represent any suitable processor or controller. The memory 360 is coupled to the main controller 340. The main controller 340 executes the registration logic 361 and the update logic 362 stored in the memory 360. The registration logic 361 processes registration messages received from the mobile stations 111–114 through the antennas 305 and the transceivers 310. The update logic 362 processes update messages received from the mobile stations 111–114 through the antennas 305 and the transceivers 310. For example, the main controller 340 may receive and identify the messages and forward the contents of the messages to the MSC 140 through the communication line interface 345.

The main controller 340 also executes the paging logic 363 stored in the memory 360. The paging logic 363 supports the paging of the mobile stations 111–114 that are receiving service from the base station 101. For example, the main controller 340 may receive a request from the MSC 140 through the communication line interface 345. The request identifies a mobile station 111 to be paged. The request may also identify the frequency that the base station 101 should use to page the mobile station 111. The main controller 340 may then page the mobile station 111, such as by generating a paging message and communicating the message to the transmit processing circuitry 315 for transmission to the mobile station 111. The paging message could be communicated on the frequency identified by the request received from the MSC 140. If the mobile station 111 responds to the page, the paging logic 363 may then cause the base station 101 to take any suitable action, such as informing the MSC 140 of the successful page and establishing a traffic connection with the mobile station 111.

Each component of the base station 101 may include any hardware, software, firmware, or combination thereof. Also, the registration logic 361, the update logic 362, and the paging logic 363 may be implemented in any suitable hardware, software, firmware, or combination thereof.

Although FIG. 3 illustrates one example of a base station 101, various changes may be made to FIG. 3. For example, any suitable number of antennas 305 and transceivers 310 could be used in the base station 101. Also, any suitable number of transceivers 310 could be coupled to each antenna 305. In addition, various components could be combined or omitted or additional components can be added according to particular needs.

Figure 4:
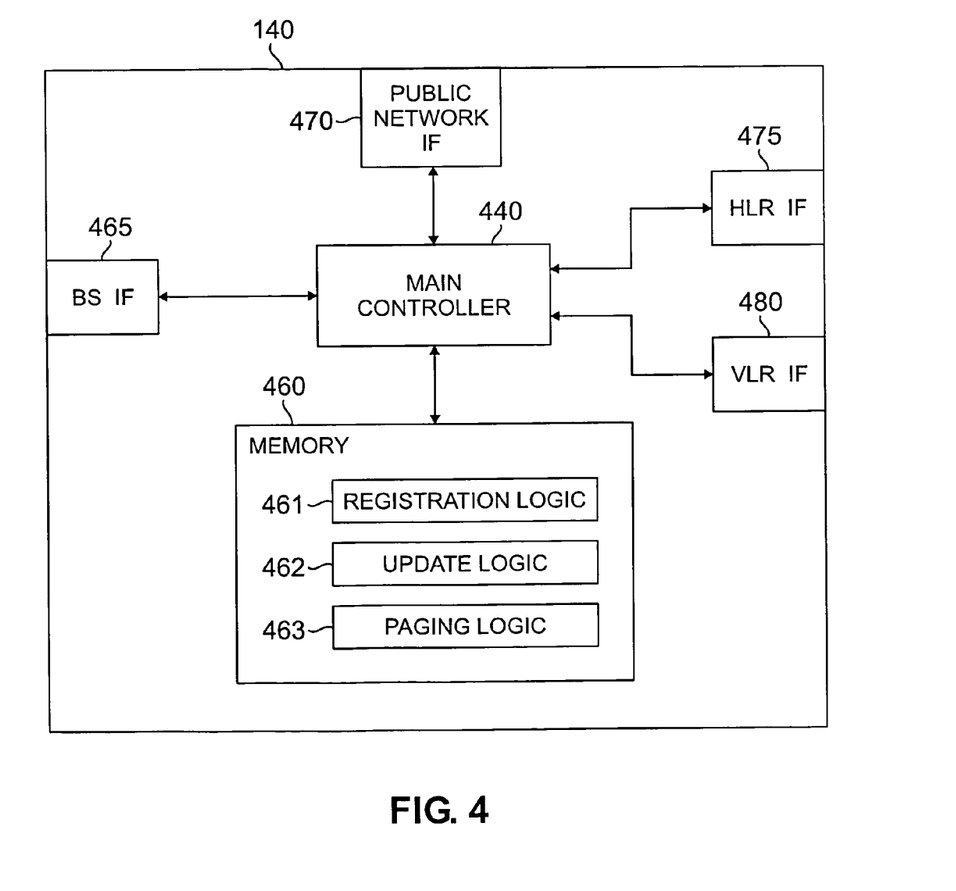
FIG. 4 illustrates an example mobile switching center according to one embodiment of this disclosure.

FIG. 4 illustrates an example mobile switching center 140 according to one embodiment of this disclosure. The MSC 140 illustrated in FIG. 4 is for illustration only. Other mobile switching centers could be used without departing from the scope of this disclosure. Also, the MSC 140 in FIG. 4 has been simplified for ease of illustration and explanation.

In this example embodiment, the MSC 140 includes a main controller 440, a memory 460, a base station interface 465, a public network interface 470, an HLR interface 475, and a VLR interface 480. The memory 460 includes registration logic 461, update logic 462, and paging logic 463.

The base station interface 465 facilitates communication with the base stations 101–103 over the communication line 131. The base station interface 465 may, for example, represent a T1 interface, a T3 interface, a fiber optic interface, or any other type of interface. The public network interface 470 facilitates communication with a public telephone network, such as a PSTN. The HLR interface 475 and the VLR interface 480 facilitate communication with the HLR 141 and the VLR 142, respectively.

The main controller 440 may represent any suitable processor or controller. The memory 460 is coupled to the main controller 440. The main controller 440 executes the registration logic 461 stored in the memory 460. The registration logic 461 facilitates the receipt, processing, and storage of registration messages from one or more mobile stations 111–114. For example, the MSC 140 may receive a registration message from a mobile station 111 through a base station 101. The main controller 440 then determines whether the mobile station 111 that is registering with the MSC 140 belongs to the wireless network 100 or is visiting the wireless network 100. Based on this determination, the main controller 440 then extracts the information contained in the registration message and stores the information in the HLR 141 or the VLR 142. In one embodiment, each registration message identifies the cell site 121 and the sector in which the registering mobile station 111 is located and the frequency used by the registering mobile station 111.

Similarly, the main controller 440 also executes the update logic 462 stored in the memory 460. The update logic 462 facilitates the receipt, processing, and storage of update messages from one or more mobile stations 111–114. For example, the main controller 440 may receive an update message, extract the information contained in the message, and store the updated information in the HLR 141 or VLR 142.

The main controller 440 further executes the paging logic 463. The paging logic 463 allows the main controller 440 to detect an incoming message or telephone call for a registered mobile station 111. The paging logic 463 may then cause the main controller 440 to access the HLR 141 or VLR 142, retrieve the stored information associated with the mobile station 111, and communicate a paging request to the base station 101 currently serving the mobile station 111. The paging request could identify the frequency to be used by the base station 101 when paging the mobile station 111. In this way, the base station 101 may be able to page the mobile station 111 using fewer resources.

Each component of the MSC 140 may include any hardware, software, firmware, or combination thereof. Also, the registration logic 461, the update logic 462, and the paging logic 463 may be implemented in any suitable hardware, software, firmware, or combination thereof.

Although FIG. 4 illustrates one example of an MSC 140, various changes may be made to FIG. 4. For example, any other or additional interfaces could be provided in the MSC 140. Also, additional components could be used in the MSC 140, such as one or more switch elements. In addition, various components could be combined or omitted or additional components can be added according to particular needs.

Figure 5:
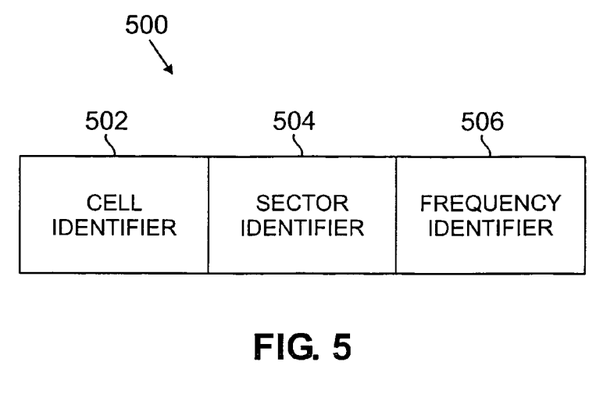
FIG. 5 illustrates an example registration message according to one embodiment of this disclosure.

FIG. 5 illustrates an example registration message 500 according to one embodiment of this disclosure. In this example, the message 500 includes a cell identifier 502, a sector identifier 504, and a frequency identifier 506. Other embodiments of the registration message 500 could be used without departing from the scope of this disclosure. Also, any other information could be included in the registration message 500.

The cell identifier 502 identifies the cell site 121 in which a registering mobile station 111 is located. The sector identifier 504 identifies the sector of the cell site 121 in which the registering mobile station 111 is located. The frequency identifier 506 identifies the frequency used by the mobile station 111 and the base station 101 to communicate. In a particular embodiment, the frequency identifier 506 identifies the frequency used by the mobile station 111 to communicate the registration message 500 to the base station 101.

In one aspect of operation, when a mobile station 111 roams into the wireless network 100, the mobile station 111 may generate and communicate the registration message 500 to the base station 101 currently serving that mobile station 111. The base station 101 may then forward the message 500 to the MSC 140, which extracts the information and stores it in the HLR 141 or the VLR 142. When the mobile station 111 needs to be paged, the MSC 140 accesses the HLR 141 or VLR 142, identifies the frequency to be used to page the mobile station 111, and communicates the frequency to the base station 101 serving the mobile station 111.

If the mobile station 111 later changes frequencies or moves to a different one of the cell sites 122–123 or to a different sector, the mobile station 111 may generate an update message. In one embodiment, the update message resembles the registration message 500. In this embodiment, the update message includes the new information, such as the new cell identifier 502, sector identifier 504, or frequency identifier 506. The update message could also omit information from the registration message 500 that has not changed, such as by omitting the cell identified 502 when the mobile station 111 remains in the same cell site 121.

Although FIG. 5 illustrates one example of a registration message 500, various changes may be made to FIG. 5. For example, any other or additional information could be contained in the registration message 500. Also, the information illustrated in FIG. 5 could be combined into a single field in the message 500. Further, the cell identifier 502 could be replaced by any other suitable identifier, such as a Location Area Code (LAC) identifier.

Figure 6:
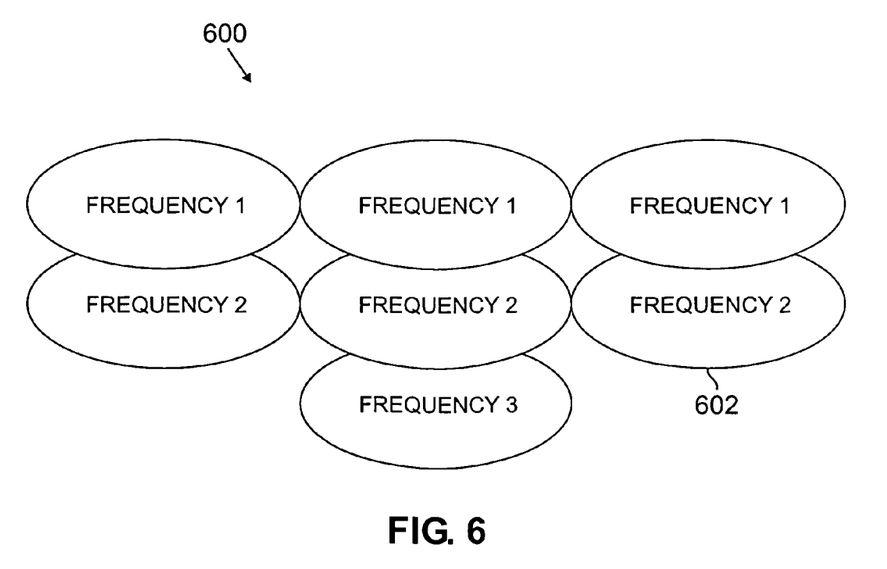
FIG. 6 illustrates an example frequency arrangement in a wireless network according to one embodiment of this disclosure.

FIG. 6 illustrates an example frequency arrangement 600 in a wireless network according to one embodiment of this disclosure. The frequency arrangement shown in FIG. 6 represents one example of a LAC zone, which may be located in one or more cell sites 121–123 of a wireless network 100. In this example, the LAC zone includes multiple frequency areas 602, where each frequency area 602 serves a particular geographic area.

In conventional systems, the location of a mobile station 111 being paged and the paging frequencies available at that location are typically not known. As a result, the conventional systems typically paged the mobile station 111 in each of the frequency areas 602. This required seven different pages. In one embodiment of this disclosure, the mobile station 111 informs the wireless network 100 of its current location (LAC identifier) and the frequency to be used to page the mobile station 111. Using this information, the wireless network 100 can identify the frequency area 602 in which the mobile station 111 is located. The wireless network 100 can then page the mobile station 111 in the proper frequency area 602, which reduces the number of pages needed.

Although FIG. 6 illustrates one example of a frequency arrangement 600 in a wireless network, various changes may be made to FIG. 6. For example, any number of frequencies and frequency areas 602 could be used in the frequency arrangement 600.

Figure 7:
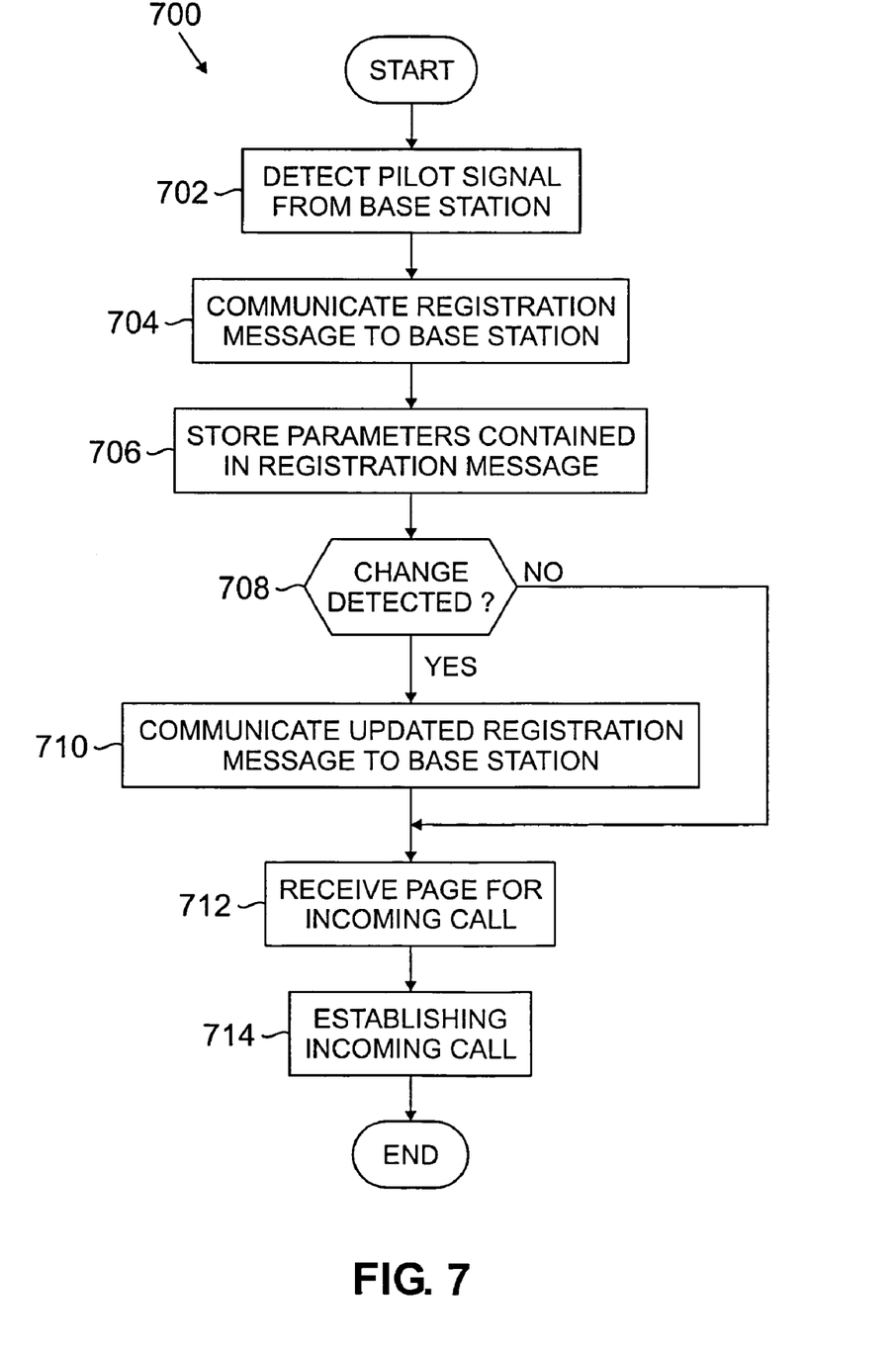
FIG. 7 illustrates an example method for receiving communication services at a mobile station according to one embodiment of this disclosure.

FIG. 7 illustrates an example method 700 for receiving communication services at a mobile station according to one embodiment of this disclosure. The method 700 may be described with respect to the mobile station 111 of FIG. 2 operating in the wireless network 100 of FIG. 1. Any mobile station operating in any wireless network could operate according to the method 700.

The mobile station 111 detects a pilot signal from a base station 101 at step 702. This may include, for example, the main processor 240 of the mobile station 111 receiving the pilot signal through the antenna 205, transceiver 210, and receive processing circuitry 225. This may also include the main processor 240 extracting information from the pilot signal, such as information identifying the cell site 121 and sector in which the mobile station 111 is located.

The mobile station 111 communicates a registration message to the base station 101 at step 704. This may include, for example, the main processor 240 generating the registration message 500 of FIG. 5 using the information extracted from the pilot signal. This may also include the main processor 240 communicating the generated message to the transmit processing circuitry 215 for communication to the base station 101 through the transceiver 210 and antenna 205.

The mobile station 111 stores the parameters contained in the communicated registration message at step 706. This may include, for example, the main processor 240 storing the cell identifier 502, sector identifier 504, and frequency identifier 506 in the memory 260 as the stored parameters 264.

The mobile station 111 determines whether a change to the stored parameters is detected at step 708. This may include, for example, the main processor 240 determining whether the pilot signal now being received from one of the base stations 101–103 identifies a new cell site or sector. This may also include the main processor 240 determining whether the pilot signal is associated with a different frequency.

If a change to the stored parameters is detected, the mobile station 111 communicates an update message to the base station 101 at step 710. This may include, for example, the main processor 240 generating an update message that resembles the registration message 500 of FIG. 5. In this example, the changed cell identifier 502, sector identifier 504, or frequency identifier 506 may be placed in the update message. The update message need not include any unchanged cell identifier 502, sector identifier 504, or frequency identifier 506.

The mobile station 111 receives a page for an incoming call or other communication session at step 712. This may include, for example, the main processor 240 detecting the page. The mobile station 111 establishes an incoming call at step 714. This may include, for example, the main processor 240 generating and communicating a response to the page. This may also include the main processor 240 and one of the base stations 101–103 establishing a traffic channel between the mobile station 111 and the base station.

Although FIG. 7 illustrates one example of a method 700 for receiving communication services at a mobile station, various changes may be made to FIG. 7. For example, the update message could have the same format as the registration message.

Figure 8:
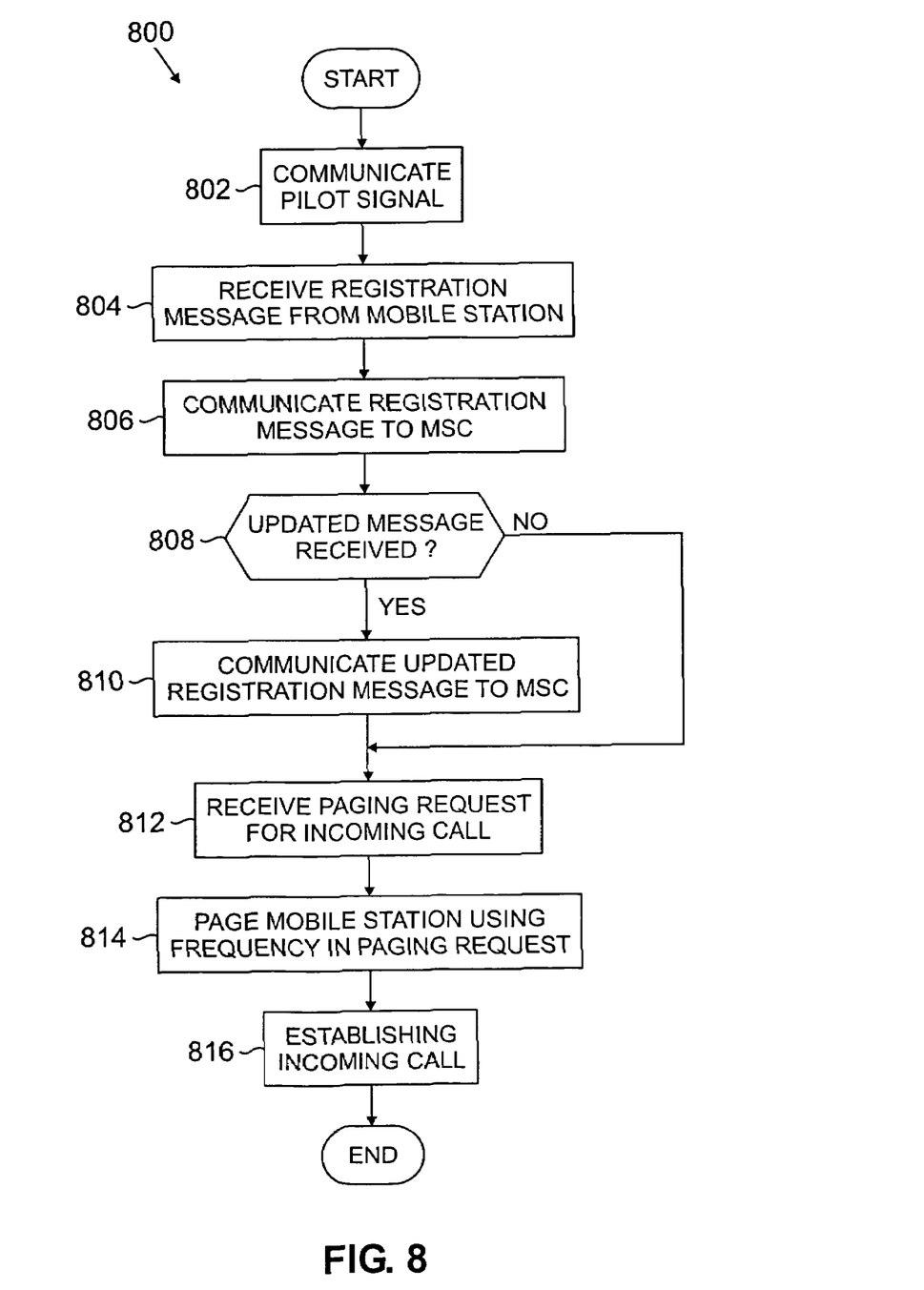
FIG. 8 illustrates an example method for providing communication services at a base station according to one embodiment of this disclosure.

FIG. 8 illustrates an example method 800 for providing communication services at a base station according to one embodiment of this disclosure. The method 800 may be described with respect to the base station 101 of FIG. 3 operating in the wireless network 100 of FIG. 1. Any base station operating in any wireless network could operate according to the method 800.

The base station 101 communicates a pilot signal at step 802. This may include, for example, the transmit processing circuitry 315 generating one or more pilot signals and one or more of the transceivers 310 communicating the pilot signals. In one embodiment, the base station 101 communicates multiple pilot signals at multiple frequencies in the cell site 121.

The base station 101 receives a registration message from a mobile station 111 at step 804. This may include, for example, the main controller 340 receiving the registration message 500 of FIG. 5 from the mobile station 111. The base station 101 communicates the registration message to the MSC 140 at step 806. This may include, for example, the main controller 340 communicating the registration message 500 to the MSC 140 through the communication line interface 345.

The base station 101 may detect an update message from the mobile station 111 at step 808. If detected, the base station 101 communicates the update message to the MSC 140 at step 810. This may include, for example, the main controller 340 communicating the update message to the MSC 140 through the communication line interface 345.

The base station 101 receives a paging request for an incoming call or other communication session at step 812. This may include, for example, the main controller 340 receiving a paging request from the MSC 140 through the communication line interface 345. This may also include the main controller 340 identifying a frequency contained in or otherwise identified by the paging request. The base station 101 pages the mobile station 111 at step 814. This may include, for example, the main controller 340 generating a paging message for the mobile station 111. This may also include the transmit processing circuitry 315 up-converting the paging message into an RF signal at the identified frequency. The base station 101 establishes the incoming call at step 816. This may include the main controller 340 and the mobile station 111 establishing a traffic channel between the mobile station 111 and the base station 101.

Although FIG. 8 illustrates one example of a method 700 for providing communication services at a base station, various changes may be made to FIG. 8. For example, the base station 101 may not receive an update message from the mobile station 111.

Figure 9:
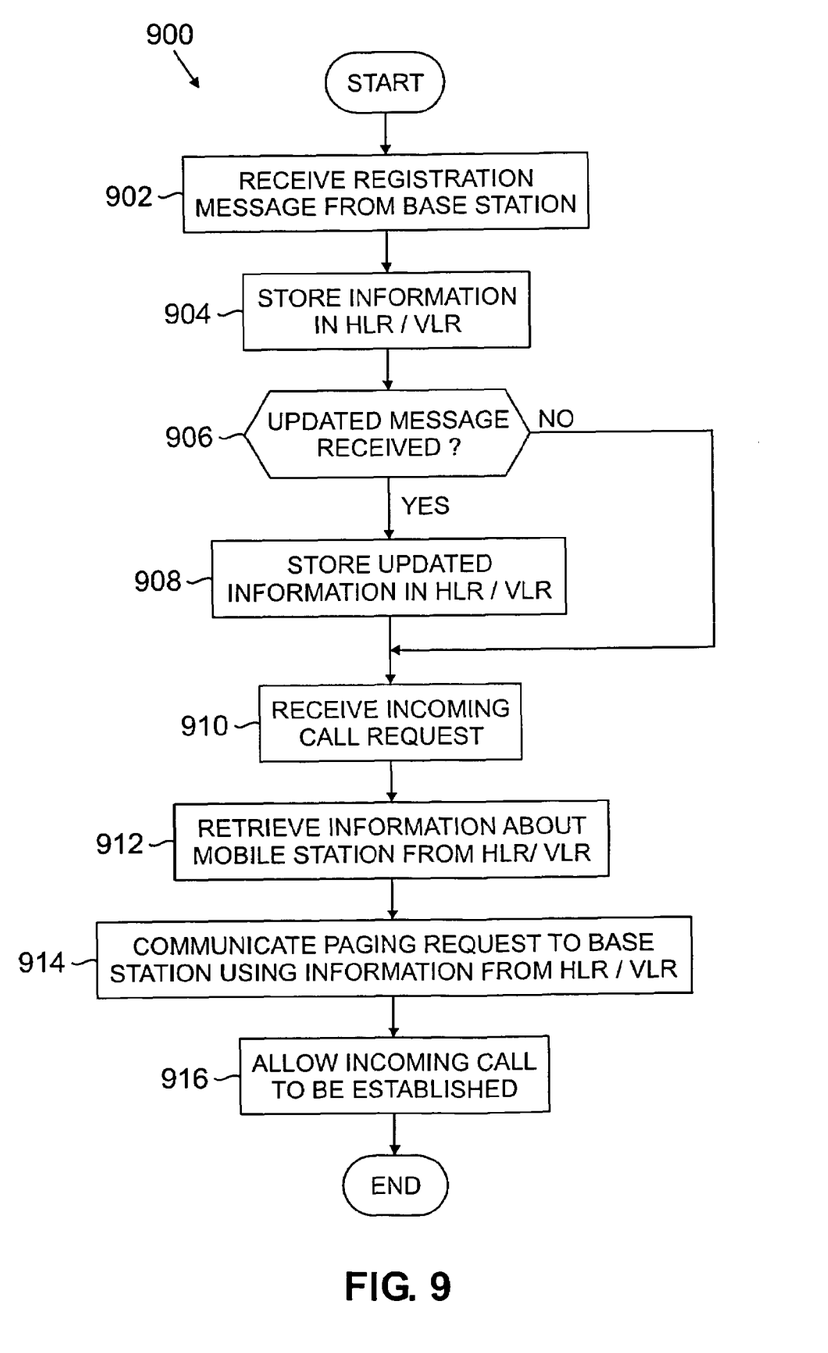
FIG. 9 illustrates an example method for providing communication services at a mobile switching center according to one embodiment of this disclosure.

FIG. 9 illustrates an example method 900 for providing communication services at a mobile switching center according to one embodiment of this disclosure. The method 900 may be described with respect to the MSC 140 of FIG. 4 operating in the wireless network 100 of FIG. 1. Any mobile switching center operating in any wireless network could operate according to the method 900.

The MSC 140 receives a registration message at step 902. This may include, for example, the main controller 440 receiving a registration message 500 through the base station interface 465. The MSC 140 stores the information from the registration message at step 904. This may include, for example, the main controller 440 extracting the cell identifier 502, sector identifier 504, and frequency identifier 506 from the message 500. This may also include the main controller 440 determining whether the registering mobile station 111 belongs to the wireless network 100 or is visiting the wireless network 100. This may further include the main controller 440 storing the extracted information in the HLR 141 or the VLR 142 depending on whether the registering mobile station 111 belongs to or is visiting the wireless network 100.

The MSC 140 may detect an update message from the mobile station 111 at step 906. If detected, the MSC 140 stores the information contained in the update message at step 908. This may include, for example, the main controller 440 extracting and storing the information from the update message in the HLR 141 or the VLR 142.

The MSC 140 receives an incoming call request at step 910. This may include, for example, the main controller 440 detecting that one of the mobile stations 112–114 is attempting to call another mobile station 111. The MSC 140 retrieves information about the called mobile station 111 at step 912. This may include, for example, the main controller 440 retrieving the cell identifier 502, sector identifier 504, and frequency identifier 506 associated with the called mobile station 111 from the HLR 141 or the VLR 142.

The MSC 140 communicates a paging request to one of the base stations 101–103 serving the called mobile station 111 at step 914. This may include, for example, the main controller 440 identifying which of the base stations 101–103 is serving the called mobile station 111 using the retrieved cell identifier 502. This may also include the main controller 440 generating a paging request that includes the sector identifier 504 and the frequency identifier 506. The MSC 140 allows the incoming call to be established at step 916. This may include, for example, the MSC 140 receiving an indication from the base station 101 that the mobile station 111 has been successfully paged.

Although FIG. 9 illustrates one example of a method 900 for providing communication services at a mobile switching center, various changes may be made to FIG. 9. For example, the MSC 140 may not receive an update message from the mobile station 111. Also, the MSC 140 could use the method 900 to establish any suitable communication session and is not limited to establishing telephone calls.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
  receiving a signal from a base station at a mobile station;
  communicating a message to the base station, the message identifying a frequency associated with the received signal;
  receiving a page from the base station on the identified frequency associated with the received signal;
  wherein the message comprises:
    a cell identifier identifying a cell site in which the mobile station is located;
    a sector identifier identifying a sector of the cell site in which the mobile station is located; and
  a frequency identifier identifying the frequency associated with the received signal; and
  detecting a change to at least one of:
    the cell site in which the mobile station is located,
    the sector of the cell site in which the mobile station is located, and
    the frequency associated with the received signal; and
  wherein if a change is detected communicating a second message identifying the change to at least one of:
    the first base station and
    a second base station.

2. The method of claim 1, wherein:
  the signal received from the base station comprises a pilot signal;
  the message comprises a registration message; and
  the frequency represents a frequency of the pilot signal.

3. The method of claim 1, wherein
communicating the second message further comprises:
including at least one of:
an updated cell identifier,
an updated sector identifier, and
an updated frequency identifier; and
omitting at least one of:
an unchanged cell identifier,
an unchanged sector identifier, and
an unchanged frequency identifier.

4. The method of claim 1, further comprising identifying the cell identifier and the sector identifier using the signal from the base station.

5. A mobile station, comprising:
an antenna operable to communicate with a base station;
a transceiver operable to receive a signal from the base station through the antenna; and
a processor operable to generate a message for the base station, the message identifying a frequency associated with the received signal;
wherein the mobile station is operable to receive a page from the base station on the identified frequency associated with the received signal and identified in the message wherein the message comprises:
a cell identifier identifying a cell site in which the mobile station is located;
a sector identifier identifying a sector of the cell site in which the mobile station is located; and
a frequency identifier identifying the frequency associated with the received signal;
wherein the processor detects a change to at least one of:
the cell site in which the mobile station is located,
the sector of the cell site in which the mobile station is located, and
the frequency associated with the received signal; and
wherein if a change is detected, the processor generates a second message for at least one of:
the first base station, and
a second base station.

6. The mobile station of claim 5, wherein:
the received signal comprises a pilot signal;
the message comprises a registration message; and
the frequency represents a frequency of the pilot signal.

7. The mobile station of claim 5 wherein
the second message further comprises:
an inclusion of at least one of:
an updated cell identifier,
an updated sector identifier, and
an updated frequency identifier; and
an omission of at least one of:
an unchanged call identifier,
an unchanged sector identifier, and
an unchanged frequency identifier.

8. The mobile station of claim 7, further comprising a memory, the processor operable to store the cell identifier, the sector identifier, and the frequency identifier contained in the first message in the memory, the processor operable to detect the change using the stored cell identifier, the stored sector identifier, and the stored frequency identifier.

9. A method, comprising:
communicating a signal at a base station;
receiving a message from a mobile station, the message identifying a frequency associated with the communicated signal;
communicating at least a portion of the message to a mobile switching center;
receiving a paging request from the mobile switching center, the paging request identifying the frequency identified in the message from the mobile station;
paging the mobile station on the frequency identified in the paging request, wherein the message comprises:
a cell identifier identifying a cell site in which the mobile station is located;
a sector identifier identifying a sector of the cell site in which the mobile station is located; and
a frequency identifier identifying the frequency associated with the communicated signal; and
receiving a second message from the mobile station, the second message comprising at least one of:
an updated cell identifier,
an updated sector identifier, and
an updated frequency identifier.

10. The method of claim 9, wherein:
the communicated signal comprises a pilot signal;
the message comprises a registration message; and
the frequency represents a frequency of the pilot signal.

11. The method of claim 9 further comprising
the second message:
omitting at least one of:
an unchanged cell identifier,
an unchanged sector identifier, and
an unchanged frequency identifier; and
communicating at least a portion of the second message to the mobile switching center.

12. A base station, comprising:
at least one antenna operable to communicate with a mobile station;
at least one transceiver operable to communicate at least one signal to the mobile station and to receive a message from the mobile station through the at least one antenna, the message identifying a frequency associated with the at least one communicated signal; and
a controller operable to:
communicate at least a portion of the message to a mobile switching center;
receive a paging request from the mobile switching center, the paging request identifying the frequency identified in the message; and
generate a paging message forte mobile station, the at least one transceiver operable to communicate the paging message to the mobile station on the frequency identified in the paging request, wherein the message comprises:
a cell identifier identifying a cell site in which the mobile station is located;
a sector identifier identifying a sector of the cell site in which the mobile station is located; and
a frequency identifier identifying the frequency associated with the communicated signal;
wherein the controller is further operable to receive a second message from the mobile station, the second message comprising at least one of:
an updated cell identifier,
an updated sector identifier, and
an updated frequency identifier.

13. The base station of claim 12, wherein:
the communicated signal comprises a pilot signal;
the message comprises a registration message; and
the frequency represents a frequency of the pilot signal.

14. The base station of claim 12, wherein
the controller is further operable to:
omit from the second message at least one of;
an unchanged cell identifier, an unchanged sector identifier, and
an unchanged frequency identifier; and
communicate at least a portion of the second message to the mobile switching center.

15. A method, comprising:
receiving a message from a base station at a mobile switching center, the message identifying a frequency associated with a signal communicated from the base station to a mobile station;
stoning at least a portion of the message;
receiving a request associated with an incoming communication session for the mobile station;
generating a paging request for the mobile station, the paging request identifying the frequency identified in the stored message;
communicating the paging request to the base station, the base station operable to page the mobile station on the frequency identified in the paging request, wherein the message comprises:
a cell identifier identifying a cell site in which the mobile station is located;
a sector identifier identifying a sector of the cell site in which the mobile station is located; and
a frequency identifier identifying the frequency associated with the communicated signal; and
receiving a second message from the base station, the second message comprising at least one of;
an updated cell identifier,
an updated sector identifier, and
an updated frequency identifier.

16. The method of claim 15, wherein:
the communicated signal comprises a pilot signal;
the message comprises a registration message generated by the mobile station; and
the frequency represents a frequency of the pilot signal.

17. The method of claim 15, wherein storing at least a portion of the message comprises:
determining whether the mobile station belongs to a wireless network served by the mobile switching center;
storing at least a portion of the message in a home location register when the mobile station belongs to the wireless network served by the mobile switching center; and
storing at least a portion of the message in a visitor location register when the mobile station does not belong to the wireless network served by the mobile switching center.

18. The method of claim 15 further comprising:
omitting from the second message at least one of:
an unchanged cell identifier,
an unchanged sector identifier, and
an unchanged frequency identifier; and
storing at least a portion of the second message.

19. A mobile switching center, comprising:
an interface operable to facilitate communication with a plurality of base stations; and
a controller operable to:
receive a message from one of the base stations, the message identifying a frequency associated with a signal communicated from the base station to a mobile station;
store at least a portion of the message;
receive a request associated with an incoming communication session for the mobile station;
generate a paging request for the mobile station, the paging request identifying the frequency identified in the stored message;
communicate the paging request to at least one of the base stations, the base station operable to page the mobile station on the frequency identified in the paging request, wherein the message comprises:
a cell identifier identifying a cell site in which the mobile station is located;
a sector identifier identifying a sector of the cell site in which the mobile station is located; and
a frequency identifier identifying the frequency associated with the communicated signal; and
receive a second message from the base station, the second message comprising at least one of:
an updated cell identifier,
an updated sector identifier, and
an updated frequency identifier.

20. The mobile switching center of claim 19, wherein:
the communicated signal comprises a pilot signal;
the message comprises a registration message; and
the frequency represents a frequency of the pilot signal.

21. The mobile switching center of claim 19, wherein the controller is operable to store at least a portion of the message by:
determining whether the mobile station belongs to a wireless network served by the mobile switching center;
storing at least a portion of the message in a home location register when the mobile station belongs to the wireless network served by the mobile switching center; and
storing at least a portion of the message in a visitor location register when the mobile station does not belong to the wireless network served by the mobile switching center.

22. The mobile switching center of claim 19, wherein the controller is further operable to:
omit from the second message at least one of:
an unchanged cell identifier,
an unchanged sector identifier, and
an unchanged frequency identifier; and
store at least a portion of the second message.

* * * * *

UNITED STATES PATENT AND TRADEMARK OFFICE
CERTIFICATE OF CORRECTION

PATENT NO. : 7,039,429 B2 Page 1 of 1
APPLICATION NO. : 10/434331
DATED : May 2, 2006
INVENTOR(S) : Purva R. Rajkotia It is certified that error appears in the above-identified patent and that said Letters Patent is hereby corrected as shown below:

Column 16, claim 12, line 43, delete "forte" and replace with --for the--.

Signed and Sealed this

Thirtieth Day of January, 2007

JON W. DUDAS
*Director of the United States Patent and Trademark Office*